United States Patent
Schmitt et al.

(10) Patent No.: US 6,611,747 B1
(45) Date of Patent: Aug. 26, 2003

(54) METHOD OF INFLUENCING THE TORQUE DELIVERED BY A VEHICLE DRIVE OF A VEHICLE

(75) Inventors: Johannes Schmitt, Markgröningen (DE); Tobias Weiss, Gerlingen (DE)

(73) Assignee: Bosch GmbH, Stuttgart (DE)

( * ) Notice: Subject to any disclaimer, the term of this patent is extended or adjusted under 35 U.S.C. 154(b) by 0 days.

(21) Appl. No.: 09/889,836

(22) PCT Filed: Dec. 4, 2000

(86) PCT No.: PCT/EP00/12163

§ 371 (c)(1),
(2), (4) Date: Nov. 5, 2001

(87) PCT Pub. No.: WO01/40041

PCT Pub. Date: Jun. 7, 2001

(30) Foreign Application Priority Data

Dec. 3, 1999 (DE) .......................... 199 58 392

(51) Int. Cl.[7] .................................. B60T 8/00
(52) U.S. Cl. ........................ 701/84; 180/197
(58) Field of Search .............. 701/84, 72, 90, 701/104; 303/139; 180/197

(56) References Cited

U.S. PATENT DOCUMENTS

| 4,966,111 A | 10/1990 | Fujimoto et al. | |
|---|---|---|---|
| 5,908,225 A | * 6/1999 | Meier | 180/197 |
| 6,064,930 A | * 5/2000 | Shibahata | 701/36 |

FOREIGN PATENT DOCUMENTS

| DE | 38 08 692 | 10/1989 | |
|---|---|---|---|
| DE | 19532528 A1 | * 3/1997 | B60K/28/10 |
| DE | 195 47 717 | 6/1997 | |
| DE | 198 44 912 | 4/2000 | |
| DE | 199 13 825 | 9/2000 | |
| EP | 0 434 970 | 7/1991 | |

* cited by examiner

Primary Examiner—Michael J. Zanelli
(74) Attorney, Agent, or Firm—Kenyon & Kenyon

(57) ABSTRACT

An exemplary method is described for influencing the moment delivered by a vehicle drive of a vehicle. In this method a change in load which occurs during cornering of the vehicle is detected, upon detection a minimum value of an intervention quantity which influences the torque delivered is determined and the vehicle drive is acted upon by the minimum value of the intervention quantity for a selectable period of time. To achieve an improvement in the change in load performance of a vehicle in cornering and an improvement in the driving performance of the vehicle in coasting operation, the minimum value determined for the intervention quantity and/or the period of time is corrected as a function of the coefficient of friction of the road surface on which the vehicle is traveling and/or as a function of a deceleration of the vehicle.

25 Claims, 6 Drawing Sheets

METHOD OF INFLUENCING THE TORQUE DELIVERED BY A VEHICLE DRIVE OF A VEHICLE

FIELD OF THE INVENTION

The present invention relates to a method and control unit for influencing the torque delivered by a vehicle drive of a vehicle.

BACKGROUND INFORMATION

Conventional methods and devices for influencing the torque of a vehicle drive of a motor vehicle are disclosed in a variety of modifications from the related art.

For example, European Patent No. 434,970 describes a method of metered addition of fuel to an internal combustion engine in coasting operation. A coasting operation is determined by the position of the gas pedal and by the rotation speed of the internal combustion engine. Metered addition of fuel in coasting operation is determined as a function of an instantaneous driving status of the motor vehicle. Regarding the instantaneous driving status, a distinction is made between when the vehicle is cornering and when it is driving straight ahead. When cornering is detected, metered addition of fuel in coasting operation is different from that in driving straight ahead, at least under certain operating conditions of the internal combustion engine.

To evaluate the instantaneous driving status, the velocity of the vehicle and/or the rotation speed of the internal combustion engine and/or the position of a gear shift and/or an output signal of a cornering detector and/or a transverse acceleration acting on the vehicle and/or the coefficient of friction of the road surface and/or slipping of any of the wheels of the vehicle, in particular a driven wheel, is processed.

With regard to cornering, it is only detected whether or not the vehicle is turning a corner. There is no determination of whether there is also a change in load during cornering at the same time. In other words, the metered addition of fuel is influenced in coasting operation during cornering in any case, even if there is no change in load during cornering.

German Published Patent Application No. 38 08 392 describes a method of preventing an excessive drag torque. When letting off on the gas pedal, a residual quantity which depends on the rotation speed is ramped up or down as a function of the change in rotation speed over time. In addition, the rotation speed-dependent residual quantity also depends on other engine operation parameters such as the engine temperature, for example.

A method of metered addition of fuel in coasting operation or influencing or regulating the drag torque can be used, for example, in a traction control system such as that described in the SAE paper 870 337 "ASR Traction Control—A Logical Extension of ABS" or in a yaw rate control system such as that described in the article "FDR— Die Fahrdynamikregelung von Bosch" [FDR—vehicle dynamics control by Bosch] in the automotive engineering journal ATZ, vol. 96, no. 11 (1994) pp. 674–689. These papers describe traditional slip control systems.

Furthermore, metered addition of fuel can also be used in a method of adjusting propulsion, as described in German Published Patent Application No. 199 13 825. This method operates as follows: an intervention quantity is determined by using engine characteristics maps. Two engine characteristics maps are provided for this purpose. On the basis of a first engine characteristics map, a first value for the intervention quantity is formed from a reference speed of the vehicle as a function of the gradient of the slip. Then on the basis of a second engine characteristics map, a second value for the intervention quantity is formed as a function of the slip and the reference velocity of the vehicle. The intervention quantity per se is obtained by adding the two values, for example. The propulsion of the vehicle is set as a function of the intervention quantity.

Furthermore, it is also conceivable to use a method of influencing the drag torque with a device such as that described in German Published Patent Application No. 198 44 912. In this device, an intervention quantity is determined as a function of a transverse acceleration and another quantity which describes the behavior of the transverse acceleration over time. The intervention quantity is determined by using two engine characteristics maps, a first engine characteristics map for the transverse acceleration and a second engine characteristics map for the other quantity. To influence the propulsion, interventions in the vehicle drive are implemented, these interventions being performed as a function of the intervention quantity.

German Published Patent Application No. 195 47 717 describes a method of influencing the torque delivered by an internal combustion engine of a motor vehicle. According to this method, cornering of the vehicle is determined first. As soon as cornering is detected, a check is performed to determine whether there is a change in load. If a change in load is detected during cornering, the quantity of fuel to be supplied to the internal combustion engine is increased, which leads to an increase in the torque delivered by the internal combustion engine. Metered addition of the increased quantity of fuel takes place for a predetermined period of time.

SUMMARY OF THE INVENTION

Based on the related art, the object of the present invention is to achieve an improvement in the change in load performance of a motor vehicle in cornering and an improvement in the driving performance of the vehicle in coasting operation.

According to an embodiment of the present invention, to achieve this object, the minimum value of a determined intervention quantity and/or a period of time for which the vehicle drive is acted upon by the minimum value are corrected as a function of the coefficient of friction of the road surface on which the vehicle is traveling and/or as a function of the deceleration of the vehicle.

If a vehicle suddenly receives no gas when cornering, the driven wheels of the vehicle may begin to slip. If the driven wheels are the rear wheels of the vehicle, the rear end of the vehicle may swerve in this situation. According to an exemplary embodiment, to prevent this, a minimum value is selected for the intervention quantity in this situation in such a way that the intervention quantity should not drop below this minimum value in order to maintain the dynamic stability of the vehicle.

In the case of a road surface having a low coefficient of friction or in the case of a great deceleration of the vehicle during cornering, there is a further increase in the risk of swerving of the rear end of the vehicle. A selected minimum value which ensures adequate dynamic stability of the vehicle in the case of a road surface with good grip or a slight deceleration can result in swerving of the rear end in the case of a slippery road surface or a great deceleration of the vehicle. According to an exemplary embodiment, to prevent this, the selected minimum value of the intervention quantity or the period of time during which the vehicle drive is acted upon by the minimum value is corrected upward as a function of the coefficient of friction of the road surface and/or the deceleration of the vehicle. The minimum value of the intervention quantity may also be corrected downward, e.g., in the case of a road surface with an especially high coefficient of friction or an especially low deceleration of the vehicle.

Thus, according to an exemplary embodiment of the present invention, the coefficient of friction of the road surface is taken into account in determining the minimum value of the intervention quantity. The torque delivered by the vehicle drive of the vehicle is influenced as a function of the coefficient of friction of the road surface. The coefficient of friction of the road surface has an important influence on the driving stability of a vehicle in cornering and in particular in a change in load during cornering, so the change in load performance of the vehicle can be greatly improved, and the dynamic stability of the vehicle can be increased to a significant extent.

In addition, with the exemplary method according to the present invention, deceleration of a vehicle is taken into account in determining the minimum value for the intervention quantity. The torque delivered by the vehicle drive is influenced as a function of deceleration. The deceleration performance of the vehicle has a significant influence on the change in load performance during cornering and on the dynamic performance of the vehicle. Deceleration of the vehicle can be taken into account as an alternative to, or in addition to, the coefficient of friction of the road surface.

Deceleration of the vehicle can be detected by an acceleration sensor, for example, or by analyzing the braking activity. The coefficient of friction of the road surface can be determined, for example, by analyzing the rotation speed of the wheels, in particular, by comparing the rotation speed of the driven wheels with the rotation speed of the non-driven wheels. It is also conceivable to determine the coefficient of friction of the road surface by using suitable tire sensors which may be designed as strain gauges (DMS) incorporated into the tire walls. A transition from static friction to sliding friction can be detected by a sudden jump in the output signals of the tire sensors. Together with the transverse acceleration acting on the vehicle and other vehicle parameters, the coefficient of friction of the road surface can then be determined. The coefficient of friction of a road surface can also be determined by optical scanning of the road surface, or by analyzing the noises generated by the wheels of the vehicle rolling on the road surface.

An object of the present invention is to counteract swerving of a vehicle which occurs during cornering due to a low coefficient of friction of the road surface, or to a large deceleration of the vehicle. This is accomplished by increasing the torque delivered by the vehicle drive of the vehicle. Correcting the minimum value of the intervention quantity or the engine torque delivered is only one of the factors in this case.

At certain operating points of an internal combustion engine or in certain dynamic states of a vehicle, it may be advantageous under some circumstances for a selected minimum value of an intervention quantity to act on the vehicle drive for a longer period of time. This has an influence on the rate at which the correction of the intervention quantity approaches zero. Thus, according to an exemplary embodiment of the present invention, a correction of the minimum value, as well as a correction of the period of time during which the selected minimum value is in effect on the vehicle drive, are both taken into account as a correction of the minimum value determined for the intervention quantity.

According to an exemplary embodiment of the present invention, it is proposed that the minimum value of the intervention quantity thus determined be increased if the coefficient of friction of the road surface drops below a selected first threshold value and/or the deceleration of the vehicle exceeds a selected second threshold value.

As an alternative or in addition, it is proposed that the vehicle drive be acted upon by the minimum value of the intervention quantity for a longer period of time if the coefficient of friction of the road surface drops below a selected first threshold value and/or if the deceleration of the vehicle exceeds a selected second threshold value. According to this implementation, the selected minimum value of the correction quantity is corrected by influencing the rate at which the correction value of the intervention quantity, and thus the correction component of the torque applied by the vehicle drive, approaches zero.

According to an exemplary embodiment of the present invention, it is proposed that the minimum value of the intervention quantity be determined from two values, a first value that is determined as a function of the rotation speed of the vehicle drive and a transverse acceleration of the motor vehicle;

a second value that is determined as a function of the slip of at least one of the wheels of the motor vehicle and the velocity of the vehicle; where the minimum value is determined from the sum of the first value and the second value.

In this case, the following relationships hold: the greater the engine rotation speed, the greater is the first value of the intervention quantity. The increase in friction in the engine caused by increase in engine rotation speed is compensated by this measure. The greater the transverse acceleration, the greater is the initial value of the intervention quantity. The intervention quantity is increased to the minimum value at a suitably high transverse acceleration, so that a drag torque is not too great and thus lateral grip of the vehicle is guaranteed. The greater the wheel slip, the greater is the second value of the intervention quantity. Since a great wheel slip is an indication of a smooth road surface, the intervention quantity must be increased in this situation. The higher the velocity of the vehicle, the larger must be the second value. With an increase in vehicle velocity, there is also an increase in the risk of swerving of the vehicle when cornering. This can be prevented by increasing the minimum value thus determined for the intervention quantity in this situation. The first value and the second value are added to the selected minimum value of the intervention quantity. The selected minimum value is then corrected as a function of the coefficient of friction and the deceleration according to the embodiment of present invention.

The minimum value of the intervention quantity is advantageously determined as a function of two engine characteristics maps, the first value being determined on the basis of a first engine characteristics map and the second value being determined on the basis of a second engine characteristics map. In the first engine characteristics map, the first value is stored as a function of the engine rotation speed and the transverse acceleration. In the second engine characteristics map, the second value is stored as a function of the wheel slip and the vehicle velocity.

According to another exemplary embodiment of the present invention, an additional possibility of correcting the minimum value determined for the intervention quantity is provided by correcting the minimum value of the intervention quantity, which is already corrected as a function of the coefficient of friction and/or deceleration, as a function of a slope of a road surface on which the vehicle is traveling and/or as a function of an absolute elevation at which the vehicle is located. The minimum value corrected for the slope and/or elevation then influences the vehicle drive. According to a particular implementation, the minimum value of the intervention quantity, which is corrected as a function of the coefficient of friction and/or deceleration, is multiplied by a correction value which depends on the slope and/or elevation for the purpose of correction. This correction factor is preferably determined on the basis of a third engine characteristics map where the following qualitative relationship holds: in traveling downhill, the minimum value of the intervention quantity is corrected downward, i.e., it is reduced, and in driving uphill the minimum value is corrected upward, i.e., it is increased.

According to a further exemplary embodiment of the present invention, it is proposed that the minimum value of the intervention quantity, which is corrected as a function of the coefficient of friction and/or the deceleration, be corrected again as a function of the temperature of the vehicle drive if there is transverse acceleration acting on the vehicle, and to have the corrected minimum value act on the vehicle drive. In this case, the lower the temperature of the vehicle drive, the larger is the correction value by which the minimum value of the intervention quantity is corrected. This should compensate for the effects of greater friction when the vehicle drive is cold.

According to yet another exemplary embodiment of the present invention, it is proposed that the minimum value of the intervention quantity, which is corrected as a function of the coefficient of friction and/or the deceleration, be further corrected as a function of the position of a gear shift of the motor vehicle if transverse acceleration is acting on the motor vehicle, and to have the corrected minimum value then act on the vehicle drive. The gear shift may be shifted mechanically or electronically. Depending on the gear selected, a correction value by which the minimum value of the intervention quantity is corrected is determined. In this case, the lower the gear selected, the greater is the correction value because the friction occurring in the vehicle drive is greater at low gears than at high gears.

According to yet another exemplary embodiment of the present invention, it is proposed that the minimum value of the intervention quantity which is corrected as a function of the coefficient of friction and/or the deceleration be further corrected as a function of the type and number of power consuming devices in operation in the motor vehicle if there is transverse acceleration acting on the motor vehicle, and to have the vehicle drive be acted upon by the minimum value. According to this embodiment, another correction value by which the minimum value of the intervention quantity is corrected is determined as a function of the power consuming devices in operation in the motor vehicle. In this case, the greater the number of power consuming devices in operation, the greater is the correction value. Also, the greater the power required by the power consuming devices being operated in the vehicle, the greater is the correction value. This embodiment takes into account the fact that not all the torque applied by the vehicle drive is transmitted to the driving wheels, but instead a portion of the torque applied is consumed by power consuming devices being operated in the motor vehicle. The more power consuming devices there are in operation in the vehicle and the greater the power required by these power consuming devices, the greater is the proportion of the engine torque that is not transferred to the driving wheels. The power consuming devices which are taken into account in this connection are power consuming devices having a relatively high power consumption such as, for example, an air conditioning system, a defroster or an improved lighting system based on xenon light.

Unlike the correction of the minimum value of the intervention quantity depending on the slope or elevation, the correction depending on temperature, the gear setting, and the power consuming devices, only applies if a transverse acceleration is acting on the vehicle. Additionally, Unlike the correction which depends on the slope or elevation, a correction value which depends on engine temperature, gear setting, or power consuming devices, is added to the minimum value of the intervention quantity to correct for influences of the engine temperature, the gear setting, and power consuming devices in operation.

According to yet another embodiment of the present invention, it is proposed that, in order to determine a change in load, the position of the gas pedal of the motor vehicle or the torque delivered by the vehicle drive be analyzed. A change in load is defined as a transition from power operation to coasting operation.

The type of intervention quantity which influences the torque delivered depends on various factors. First, different intervention quantities may be used for different vehicle drives to influence the torque delivered by the vehicle drive. In addition, there may be different influencing quantities by which the torque delivered by the vehicle drive is influenced in a particular vehicle drive.

According to a further implementation of the present invention, it is proposed that a quantity of fuel injected into a combustion chamber of a vehicle drive designed as a direct-injection internal combustion engine be used as the intervention quantity to influence the torque delivered. In the case of manifold injection, the quantity of fuel to be injected into the intake manifold may also be used.

According to another implementation of the present invention, it is proposed that a time for injection of fuel be used as the intervention quantity to influence the torque delivered in the case of a vehicle drive designed as an internal combustion engine.

According to another implementation of the present invention, it is proposed that an ignition time of a fuel/air mixture present in a combustion chamber of a vehicle drive designed as an internal combustion engine be used as the intervention quantity to influence the torque delivered.

In addition, it is also proposed that an angle of a throttle valve of a vehicle drive designed as an internal combustion engine be used as the intervention quantity to influence the torque delivered.

Finally, it is proposed that an electric current or voltage of a propulsion vehicle drive designed as an electric motor be used as the intervention quantity to influence the torque delivered.

According to another embodiment of the present invention, a control unit performs a correction of the minimum value determined for the intervention quantity and/or the period of time for which the vehicle drive is acted upon by the minimum value. In this case, the correction is a function of the coefficient of friction of the road surface on which the vehicle is traveling and/or a function of a deceleration of the vehicle.

Additionally, in one implementation of the exemplary method of the present invention, a memory element is provided for a control unit for dynamic control of a vehicle. A computer program which is capable of running on a computer, in particular a microprocessor, and is suitable for carrying out the exemplary method according to the present invention is stored on this memory element. In this case, the exemplary method of the present invention is implemented by a computer program stored in the memory element. The memory element may be implemented as an electric storage medium such as a read-only memory, a random-access memory or a flash memory.

The present invention also provides a computer program suitable for carrying out the exemplary method according to the present invention when it is run on a computer, in particular a microprocessor. The computer program amy be stored in a memory element, in particular a flash memory.

DETAILED DESCRIPTION

Figure 1:
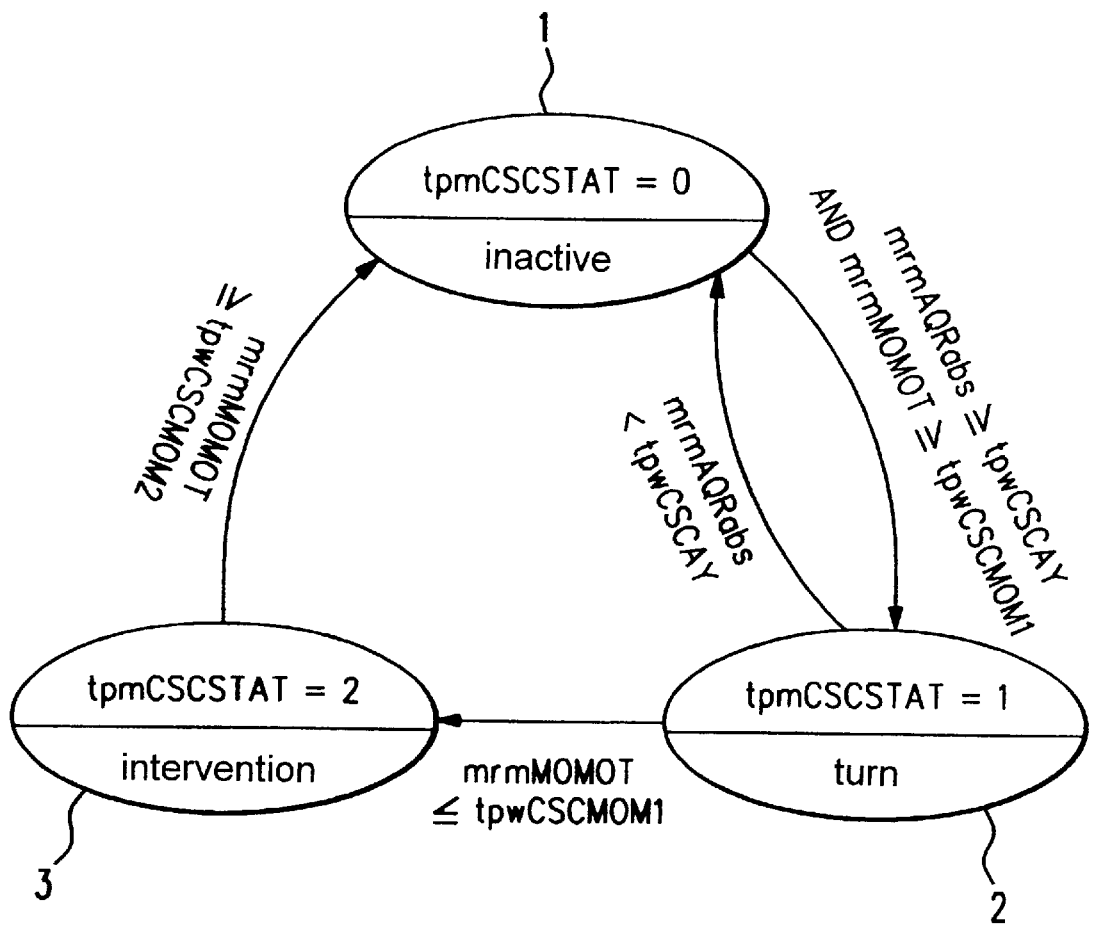
FIG. 1 shows a state diagram of an exemplary method according to the present invention for correcting a minimum value of an intervention quantity.

FIG. 1 shows various states of an exemplary method according to the present invention for influencing the torque delivered by a vehicle drive of a vehicle. The torque delivered by the vehicle drive can be influenced by way of an intervention quantity.

The minimum value of the intervention quantity and thus the minimum value of the torque delivered by the vehicle drive are determined by a control unit of the vehicle drive. The control unit determines the intervention quantity by a method described, for example, in German Published Patent Application No. 199 13 825 that discusses improving the dynamic properties of a vehicle changing in load during cornering, in which the intervention quantity may be increased to a minimum value. The vehicle drive is then acted upon by the minimum value of the intervention quantity for a selected period of time and delivers a torque which is increased accordingly for this period of time.

According to the present invention, the minimum value of the intervention quantity thus determined is corrected as a function of the coefficient of friction of the road surface on which the vehicle is traveling and/or as a function of the deceleration of the vehicle. As an alternative or in addition, the period of time for which the vehicle drive is acted upon by the minimum value of the intervention quantity is corrected as a function of the coefficient of friction and/or as a function of the deceleration. In this way, the vehicle can be kept in a dynamically stable condition or it can be stabilized dynamically during cornering even in extreme dynamic situations (slippery road surface, or large deceleration).

The exemplary method according to the present invention may assume three states as illustrated in FIG. 1. In a first state 1, the method is "inactive." A state variable tpmCSC-STAT has a value of 0. From first state 1, the method goes to a second state 2 when transverse acceleration mrmAQRabs acting on the vehicle is equal to or greater than a respective acceleration threshold tpwCSCAY and when engine torque mrmMOMOT is equal to or greater than a respective first threshold value tpwCSCMOM1. Second state 2 characterizes cornering of the vehicle ("turning"). In second state 2, state variable tpmCSCSTAT has a value of 1. The method returns from second state 2 back to first state 1 when transverse acceleration mrmAQRabs is less than a respective acceleration threshold value tpwCSCAY. In first state 1 as well as second state 2, there is no change in the intervention quantity in the sense of a predefined minimum value.

The method goes from second state 2 to a third state 3 when engine torque mrmMOMOT is less than or equal to a respective first threshold value tpwCSCMOM1. In third state 3, the method is "active" and an intervention takes place in that a minimum value is output for the intervention quantity. In third state 3, state variable tpmCSCSTAT has a value of 2. The method departs from third state 3 and enters first state 1 when engine torque mrmMOMOT is greater than or equal to a respective second threshold value tpwCSC-MOM2.

Similar states are described in from German Published Patent Application No. 199 13 825 which is herewith incorporated by reference. To improve the stability of the vehicle, in particular when the vehicle is changing in load while turning a corner, in third state 3, the selected minimum value of the intervention quantity or the period of time for which the vehicle drive is acted upon by the minimum value is corrected as a function of various dynamic parameters according to the present invention.

Figure 2:
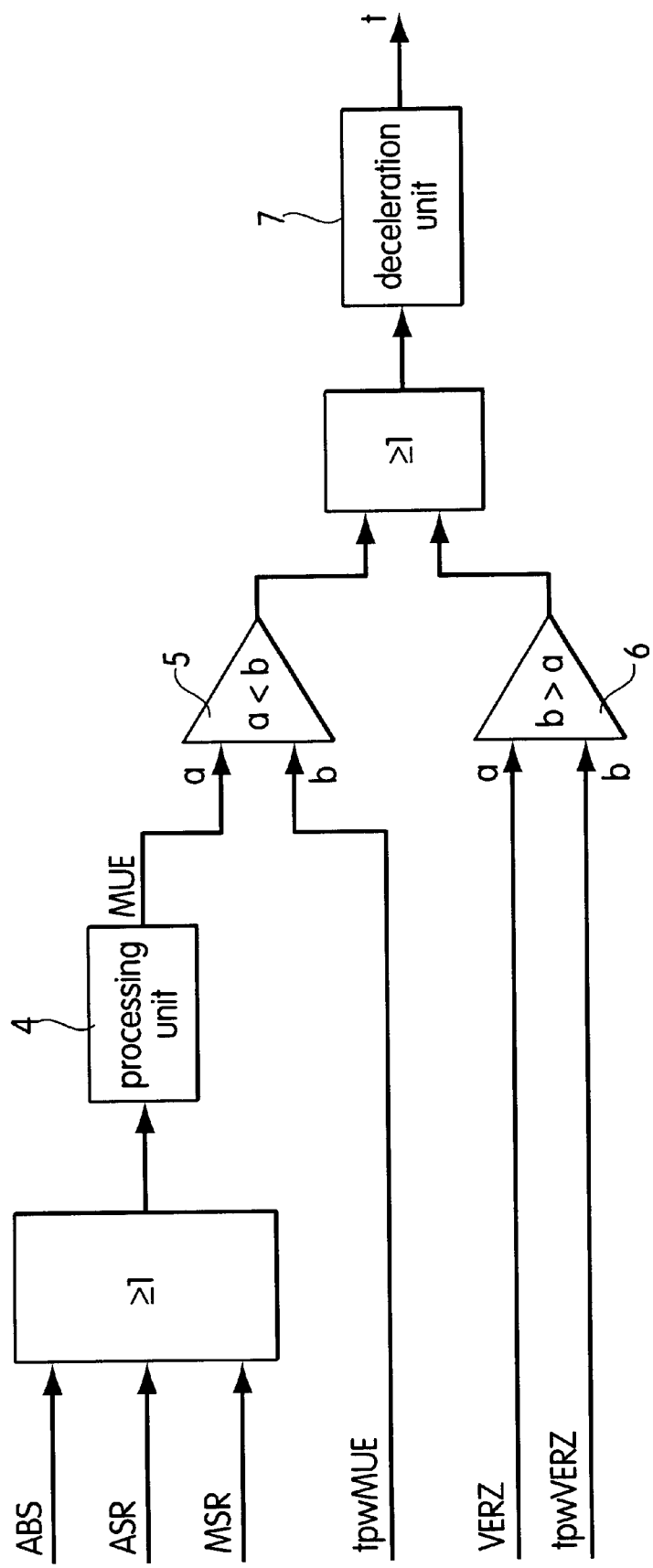
FIG. 2 shows a function diagram of an exemplary method according to the present invention for correcting a minimum value of an intervention quantity.

Dynamic parameters as a function of which the minimum value of the intervention quantity is corrected here include the coefficient of friction of the road surface on which the vehicle is traveling and/or the deceleration of the vehicle. FIG. 2 shows a function diagram of an exemplary embodiment of the method according to the present invention, where instead of correcting the minimum value of the intervention quantity thus determined, the period of time t, during which the vehicle drive is acted upon by the minimum value thus determined, is corrected.

To determine coefficient of friction MUE, the information regarding activation of a traction control system ABS, an anti-slip control system ASR and an engine drag torque control MSR is used. A processing unit 4 determines how often one or more of these functions have been activated within a selected time window and/or the intensity with which they were activated. An output signal MUE of processing unit 4 is sent to a comparator unit 5, where it is compared with a respective threshold value tpwMUE. If output signal MUE is less than threshold value tpwMUE, a low coefficient of friction MUE of the road surface is assumed.

Figure 5:
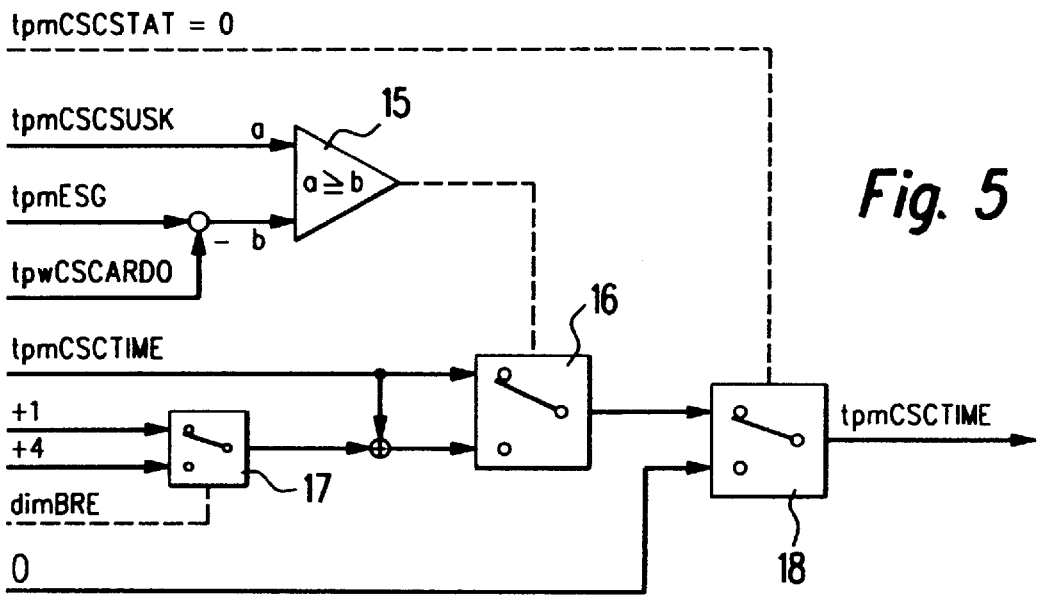
FIG. 5 shows a function diagram of an exemplary method of incrementing a timer, which corresponds to the period of time for which the corrected minimum value of the intervention quantity is applied to the vehicle drive.

In a second comparator unit 6, deceleration VERZ of the vehicle is compared with a respective threshold value tpwVERZ. If coefficient of friction MUE of the road surface is below threshold value tpwMUE and/or if deceleration VERZ exceeds threshold value tpwVERZ, then period of time t, during which the vehicle drive is acted upon by the minimum value of the intervention quantity, is lengthened in a deceleration unit 7. FIG. 5 shows a corresponding function diagram.

Figure 3:
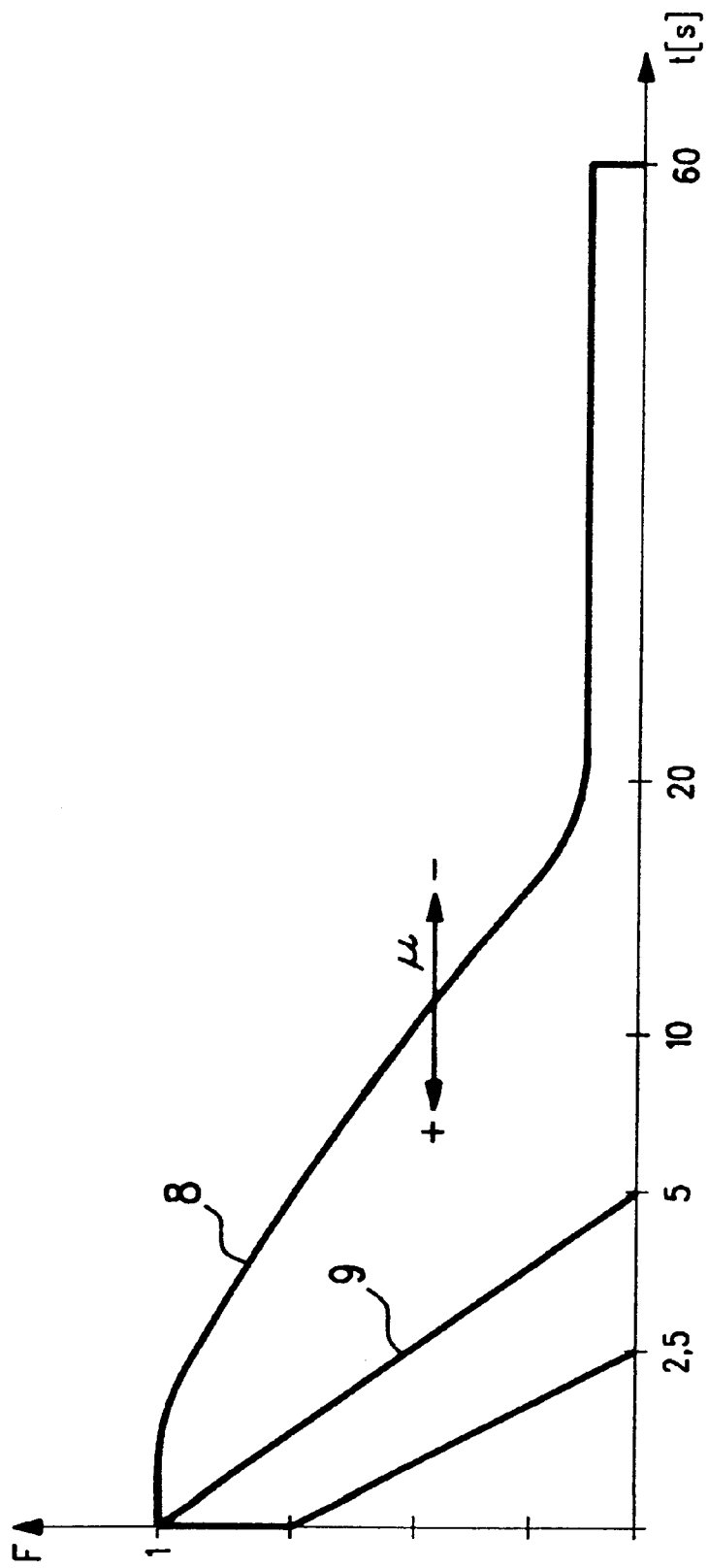
FIG. 3 shows curves of different correction values as a function of time for which a corrected minimum value of an intervention quantity is applied to a vehicle drive of a motor vehicle. The curves shown represent various coefficients of friction of a road surface on which the vehicle is traveling.

FIG. 3 shows curves of various correction values as a function of time t during which the corrected minimum value of the intervention quantity is applied to the vehicle drive for various coefficients of friction MUE of a road surface. Active duration t of the method according to the present invention—represented by a double arrow μ—is lengthened in the case of a low coefficient of friction MUE (−) of the road surface (see curve 8). In the case of a higher coefficient of friction MUE (+), active duration t of the method according to the present invention can be shortened accordingly (see curve 9). Thus, the duration and frequency of response of an indicator for a low coefficient of friction MUE lengthens active time t of the exemplary method according to the present invention.

Unlike the illustration in FIG. 2, coefficient of friction MUE of the road surface may also be determined by analyzing rotation speed N of the wheels of the vehicle, in particular the driving wheels. An optical analysis of the road surface or an acoustic analysis of tire noise would is also possible. Additionally, coefficient of friction MUE of the road surface could also be determined by suitable sensors incorporated into the tire walls, e.g., by strain gauges DMS.

As an alternative to the lengthening of active duration t of the exemplary method according to the present invention by deceleration unit 7 as illustrated in FIG. 2, the minimum value of the intervention quantity thus determined could also be increased for the correction, if coefficient of friction MUE of the road surface is below threshold value tpwMUE and/or if deceleration VERZ exceeds threshold value tpwVERZ.

Figure 4:
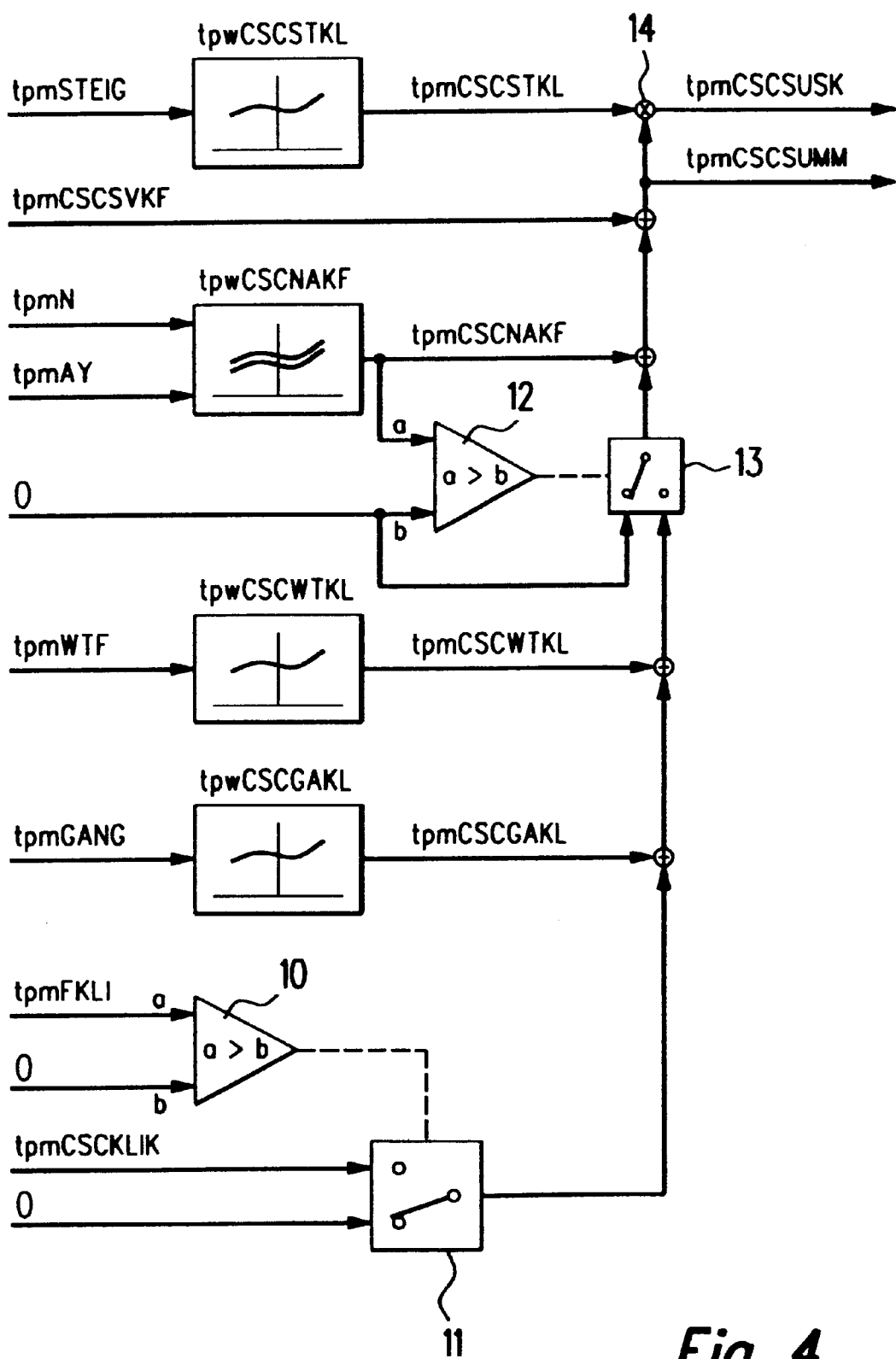
FIG. 4 shows a function diagram of additional exemplary embodiments of a method according to the present invention.

In addition to the possibility of correcting the minimum value determined for the intervention quantity as illustrated in FIG. 2, it can also be corrected as a function of other vehicle dynamics parameters, as illustrated in FIG. 4. A quantity tpmN for the rotation speed of the vehicle drive and another quantity tpmAY for the transverse acceleration of the vehicle are sent to an engine characteristics map tpwCSCNAKF on the basis of which a minimum value tpmCSCNAKF which depends on rotation speed and transverse acceleration is determined for the intervention quantity.

Minimum value tpmCSCNAKF can be corrected as a function of the absolute elevation at which the vehicle is located. To do so, an offset value tpmCSCSVKF, corresponding to the absolute elevation, is added to minimum value tpmCSCNAKF. Offset value tpmCSCSVKF depends on closure and therefore is not applicable. In addition, minimum value tpmCSCNAKF can be corrected as a function of slope tpmSTEIG of the road surface on which the vehicle is traveling. To do so, gradient tpmSTEIG is sent to an engine characteristics map tpwCSCSTKL on the basis of which a slope-dependent correction factor tpmCSCSTKL is determined. Minimum value tpmCSCNAKF or the corrected minimum value is multiplied by correction factor tpmCSCSTKL.

Other correction factors may also be added to minimum value tpmCSCNAKF if transverse acceleration is acting on the vehicle or if minimum value tpmCSCNAKF, which depends on rotation speed and transverse acceleration, is greater than 0. Minimum value tpmCSCNAKF is therefore sent to a comparator unit 12 where it is compared with the value "0." The output signal of comparator unit 12 controls a switchgear unit 13. If minimum value tpmCSCNAKF is equal to or less than "0", then switchgear unit 13 remains in the position illustrated in FIG. 4 and the value "0" is applied at its output. If minimum value tpmCSCNAKF is greater than "0" i.e., there is transverse acceleration, then switchgear unit 13 switches and other correction values tpmCSCWTKL, tpmCSCGAKL and/or tpmCSCKLIK, are applied at the output of switchgear unit 13.

A quantity tpmWTF for the temperature of the vehicle drive is sent to another engine characteristics map tpwCSCWTKL on the basis of which a temperature-dependent correction value tpmCSCWTKL is determined. A quantity tpmGANG for the selected gear of a gear unit of the vehicle is sent to another engine characteristics map tpwCSCGAKL. A correction value tpmCSCGAKL which depends on the gear shift position is determined on the basis of engine characteristics map tpwCSCGAKL and is added to temperature-dependent correction value tpmCSCWTKL. Another quantity tpmFKLE contains information about whether or not an air-conditioning compressor is in operation in the vehicle. Quantity tpmFKLE is sent to a comparator unit 12. A switchgear unit 11 is controlled as a function of an output signal of comparator unit 10. If the air-conditioning compressor is in operation, switchgear unit 11 is operated so that a correction value tpwCSCKLIK which depends on the power consuming units is applied at the output of switchgear unit 11. Otherwise, switchgear unit 11 remains in the position illustrated in FIG. 4 and "0" is applied at the output of switchgear unit 11.

In an expansion of the function diagram from FIG. 4, it is conceivable to take into account the operation of another power consuming unit of the vehicle, such as a windshield heater or rear window heater or a xenon light system, with a corresponding correction value in correcting minimum value tpmCSCNAKF of the intervention quantity. Correction value tpwCSCKLIK, which depends on the power consuming units, is added to correction value tpmCSCGAKL, which depends on the gear shift position, and to correction value tpmCSCWTKL, which depends on the temperature. As mentioned above, the sum of these three correction values is added to minimum value tpmCSCNAKF only if a transverse acceleration is acting on the vehicle.

A sum tpmCSCSUMM of minimum value tpmCSCNAKF plus correction value tpmCSCSVKF and optionally correction values tpmCSCWTKL, tpmCSCGAKL and/or tpmCSCKLIK is obtained as the output quantity of the function diagram from FIG. 4. Sum tpmCSCSUMM of the characteristic values is multiplied by slope-dependent correction value tpmCSCSTKL in a multiplier 14. The product, i.e., the slope-compensated sum, is called tpmCSCSUSK.

On the basis of FIG. 5, the following description explains how a timer tpmCSCTIME which corresponds to active duration t of the method according to the present invention (see FIG. 3) is incremented. The exemplary method according to the present invention becomes operative when slope-compensated sum tpmCSCSUSK is equal to or greater than value tpmESG determined for the adjustment quantity minus an offset tpwCSCARDO. The comparison is performed in a comparator unit 15. With the help of an output signal of comparator unit 15, a switchgear unit 16 is controlled. Switchgear unit 16 outputs as an output signal either a value of timer tpmCSCTIME or a value of timer tpmCSCTIME incremented by a certain quantity (+1 or +4). If brakes dimBRE of the vehicle are operated (increased deceleration of the vehicle), timer tpmCSCTIME is incremented by "+4."

Otherwise, it is incremented by "+1." The system switches between addends "+1" and "+4" with the help of another switchgear unit 17. Yet another switchgear unit 18 is provided, this being operated by a reset signal tpmCSCSTAT=0. When reset signal tpmCSCSTAT=0 is activated, timer tpmCSCTIME has a value of "0" at the output. Otherwise, the incremented value for timer tpmCSCTIME is output and the vehicle drive of the vehicle is driven with the minimum value of the intervention quantity thus determined for a corresponding period of time t.

Figure 6:
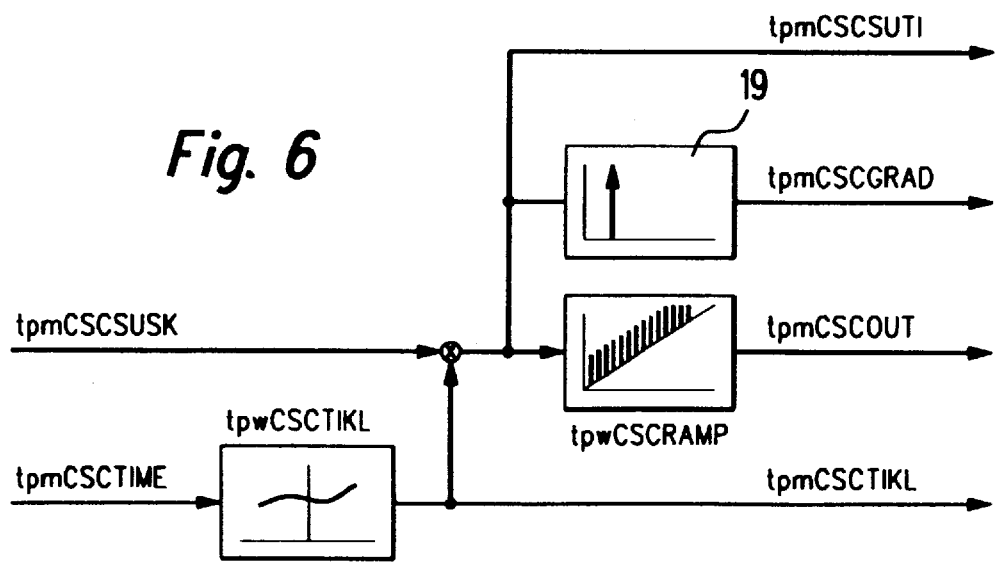
FIG. 6 shows a function diagram of an exemplary method of limiting the corrected minimum value of an intervention quantity in the form of a ramp.

FIG. 6 shows another function diagram where the variation of the corrected minimum value of the intervention quantity is limited by a time ramp tpwCSCRAMP to prevent sudden changes in the intervention quantity. A weighting factor tpmCSCTIKL is determined in an engine characteristics map tpwCSCTIKL as a function of timer tpmCSCTIME. This factor is usually between 0 and 3. Slope-compensated sum tpmCSCSUSK is multiplied by weighting factor tpmCSCTIKL. The output quantity of multiplication is a time-weighted sum tpmCSCSUTI. In a function block 19, slope tpmCSCGRAD of the adjustment quantity is calculated from time-weighted sum tpmCSCSUTI. In addition, a slope-limited output signal tpmSCOUT is determined from time-weighted sum tpmCSCSUTI by using a engine characteristics map tpwCSCRAMP.

Figure 7:
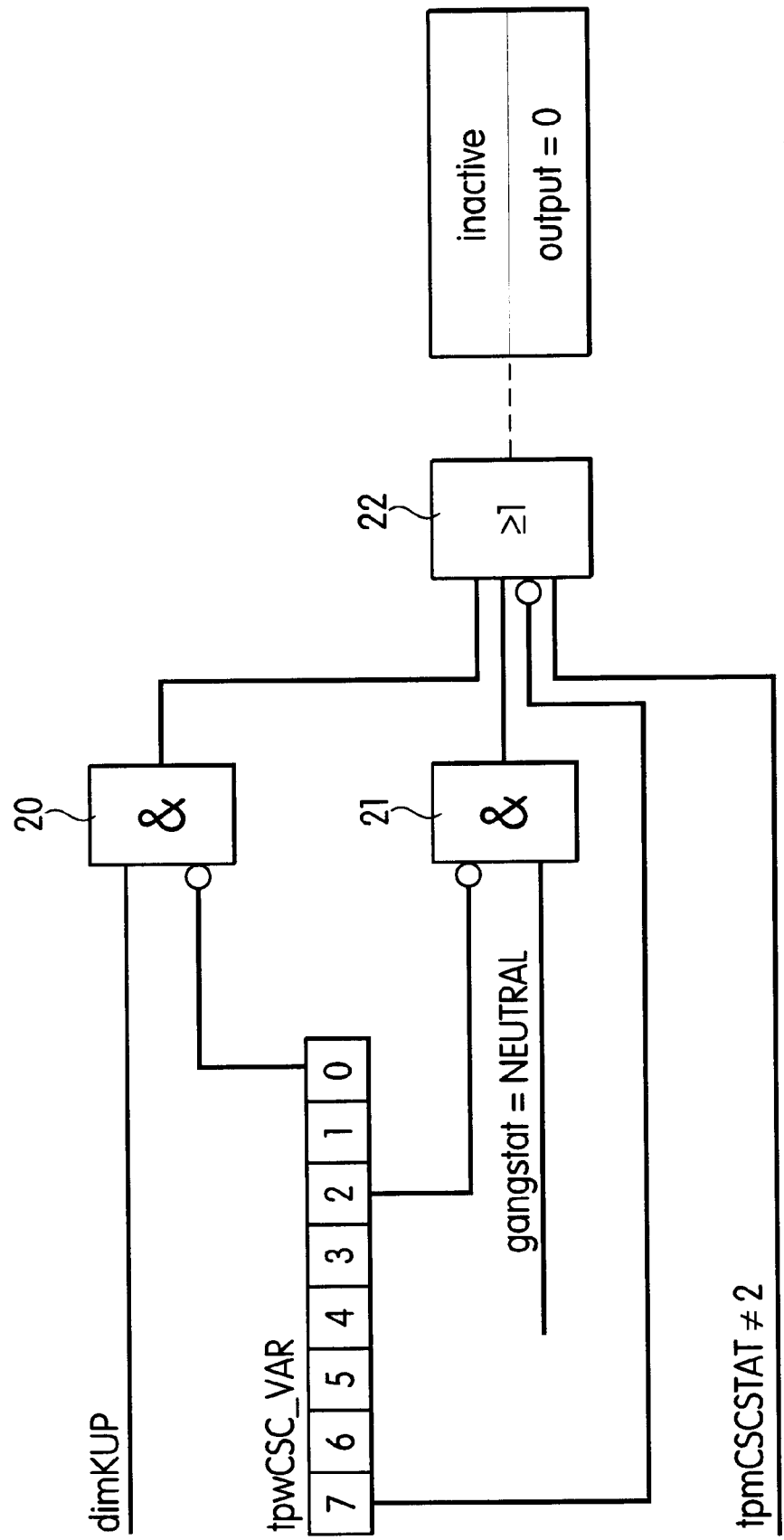
FIG. 7 shows a function diagram of an exemplary method of deactivation of the method according to the present invention.

FIG. 7 illustrates when the exemplary method according to the present invention is deactivated. This is the case, for example, when a clutch dimKUP of the vehicle is disengaged and no intervention by the method according to the present invention is desired (AND gate 20). The method is also deactivated when the gear gangstat of the vehicle is in a neutral setting NEUTRAL and no intervention by the method according to the present invention is desired (AND gate 21). In addition, the method is deactivated when a main switch is turned off.

One variable tpwCSC_VAR contains the information regarding whether intervention is desired with the clutch disengaged (bit 0), whether intervention in a neutral gear setting is desired (bit 2), and whether the main switch is turned on (bit 7).

The exemplary method according to the present invention is also deactivated when state variable tpmCSCSTAT≠2 (see FIG. 1). If one of these prerequisites is met, the exemplary method according to the present invention is deactivated and all the outputs are reset.

What is claimed is:

1. A method of influencing a torque delivered by a vehicle drive of a vehicle, comprising the steps of:
   detecting a transition from a power operation to a coasting operation of the vehicle that occurs during a cornering of the vehicle;
   determining a minimum value of an intervention quantity that influences the torque delivered by the vehicle drive if the transition from the power operation to the coasting operation of the vehicle occurs during the cornering;
   acting on the vehicle drive by the minimum value for a selectable period of time; and
   correcting at least one of the minimum value and the selectable period of time as a function of at least one of a coefficient of friction of a road surface on which the vehicle is traveling and a deceleration of the vehicle.

2. The method according to claim 1, further comprising the step of:
   increasing the minimum value if at least one of the following is true:
   the coefficient of friction of the road surface is less than a selectable first threshold value, and
   the deceleration of the vehicle exceeds a selectable second threshold value.

3. The method according to claim 1 wherein:
   the vehicle drive is acted upon by the minimum value for a longer period of time if at least one of the following is true:
   the coefficient of friction of the road surface is less than a selectable first threshold value, and
   the deceleration of the vehicle exceeds a selectable second threshold value.

4. The method according to claim 1, wherein:
   the minimum value is determined from a sum of a first value and a second value,
   the first value is determined as a function of a rotation speed of the vehicle drive and a transverse acceleration of the vehicle, and
   the second value is determined as a function of a slip of at least one wheel of the vehicle and a velocity of the vehicle.

5. The method according to claim 4, wherein:
   the minimum value is determined as a function of a first engine characteristics map and a second engine characteristics map,
   the first value is determined on the basis of the first engine characteristics map, and
   the second value is determined on the basis of the second engine characteristics map.

6. The method according to claim 5, further comprising the steps of:
   correcting the minimum value as a function of at least one of a slope of the road surface on which the vehicle is traveling and an absolute elevation at which the vehicle is located; and
   acting upon the vehicle drive by the corrected minimum value.

7. The method according to claim 6, further comprising the step of:
   multiplying the corrected minimum value by a correction factor that depends on at least one of the slope and the absolute elevation.

8. The method according to claim 7, further comprising the step of:
   determining the correction factor on the basis of a third engine characteristics map.

9. The method according to claim 8, further comprising the step of:
   adding to the minimum value a correction value that depends on at least one of an engine temperature, a gear setting, and power consuming units.

10. The method according to claim 8, further comprising the step of:
    analyzing one of a position of a gas pedal of the vehicle and the torque delivered by the vehicle drive in order to determine the transition from the power operation to the coasting operation of the vehicle.

11. The method according to claim 1, further comprising the steps of:
    correcting the minimum value as a function of a temperature of the vehicle drive if a transverse acceleration acts on the vehicle; and
    acting on the vehicle drive by the corrected minimum value.

12. The method according to claim 1, further comprising the steps of:
  correcting the minimum value as a function of a position of a gear shift of the vehicle if a transverse acceleration is acting on the vehicle; and
  acting on the vehicle drive by the corrected minimum value.

13. The method according to claim 1, further comprising the steps of:
  correcting the minimum value as a function of a type and a number of power consuming units present and in operation in the vehicle if a transverse acceleration is acting on the vehicle; and
  acting on the vehicle drive by the corrected minimum value.

14. The method according to claim 1, wherein:
  the intervention quantity corresponds to a quantity of a fuel to be injected,
  the vehicle drive includes an internal combustion engine, and
  the intervention quantity influences the torque delivered by the internal combustion engine.

15. The method according to claim 1, wherein:
  the intervention quantity corresponds to a time of injection of a fuel,
  the vehicle drive includes an internal combustion engine, and
  the intervention quantity influences the torque delivered by the internal combustion engine.

16. The method according to claim 1, wherein:
  the intervention quantity corresponds to a time of ignition of a fuel/air mixture,
  the vehicle drive includes an internal combustion engine, and
  the intervention quantity influences the torque delivered by the internal combustion engine.

17. The method according to claim 1, wherein:
  the intervention quantity corresponds to an angle of a throttle valve of an internal combustion engine,
  the vehicle drive includes the internal combustion engine, and
  the intervention quantity influences the torque delivered by the internal combustion engine.

18. The method according to claim 1, wherein:
  the intervention quantity corresponds to one of an electric current and a voltage of the vehicle drive,
  the vehicle drive includes an electric motor, and
  the intervention quantity influences the torque.

19. A control unit for driving a dynamics control of a motor vehicle, comprising:
  an arrangement for detecting a transition from a power operation to a coasting operation of the vehicle that occurs during a cornering of the vehicle;
  an arrangement for determining the minimum value of an intervention quantity that influences the torque delivered by a vehicle drive if the transition from the power operation to the coasting operation of the vehicle occurs during the cornering;
  an arrangement for acting on the vehicle drive by the minimum value for a selectable period of time; and
  an arrangement for correcting at least one of the minimum value and the selectable period of time as a function of at least one of a coefficient of friction of a road surface on which the vehicle is traveling and a deceleration of the vehicle.

20. A memory element for a control unit of a driving dynamics control system of a vehicle in which is stored a computer program capable of running on a computer, the computer program causing the computer to perform the steps of:
  detecting a transition from a power operation to a coasting operation of the vehicle that occurs during a cornering of a vehicle;
  determining a minimum value of an intervention quantity that influences the torque delivered by a vehicle drive if the transition from the power operation to the coasting operation of the vehicle occurs during the cornering;
  acting on the vehicle drive by the minimum value for a selectable period of time; and
  correcting at least one of the minimum value and the selectable period of time as a function of at least one of a coefficient of friction of a road surface on which the vehicle is traveling and a deceleration of the vehicle.

21. The memory element according to claim 20, wherein:
  the memory element includes one of a read-only memory, a random-access memory, and a flash memory.

22. The memory element according to claim 21, wherein:
  the computer includes a microprocessor.

23. A computer program storable on a computer readable medium and executable by a computer, the computer program comprising:
  program code to influence a torque delivered by a vehicle drive of a vehicle by performing the following:
    detecting a transition from a power operation to a coasting operation of the vehicle that occurs during a cornering of a vehicle;
    determining a minimum value of an intervention quantity that influences the torque delivered by the vehicle drive if the transition from the power operation to the coasting operation of the vehicle occurs during the cornering;
    acting on the vehicle drive by the minimum value for a selectable period of time; and
    correcting at least one of the minimum value and the selectable period of time as a function of at least one of a coefficient of friction of a road surface on which the vehicle is traveling and a deceleration of the vehicle.

24. The computer program according to claim 23, wherein:
  the computer readable medium includes a memory element.

25. The computer program according to claim 24, wherein:
  the memory element includes a flash memory.

* * * * *